US012719353B2

(12) United States Patent
Cheng et al.

(10) Patent No.: US 12,719,353 B2
(45) Date of Patent: Aug. 25, 2026

(54) POWER SUPPLY DEVICE AND POWER SUPPLY METHOD THEREOF

(71) Applicant: ASUSTek COMPUTER INC., Taipei City (TW)

(72) Inventors: Bo-Siang Cheng, Taipei City (TW); Hsiang-Jui Hung, Taipei City (TW); Min-Hou Kuo, Taipei City (TW); Jia-Ching Huang, Taipei City (TW); Yen-Yong Wu, Taipei City (TW)

(73) Assignee: ASUSTeK COMPUTER INC., Taipei City (TW)

( * ) Notice: Subject to any disclaimer, the term of this patent is extended or adjusted under 35 U.S.C. 154(b) by 0 days.

(21) Appl. No.: 19/070,477

(22) Filed: Mar. 4, 2025

(65) Prior Publication Data

US 2025/0337315 A1 Oct. 30, 2025

(30) Foreign Application Priority Data

Apr. 26, 2024 (TW) ................................ 113115824

(51) Int. Cl.
*H02M 1/10* (2006.01)
*H02J 1/08* (2026.01)

(52) U.S. Cl.
CPC ................ *H02M 1/10* (2013.01); *H02J 1/08* (2013.01)

(58) Field of Classification Search
None
See application file for complete search history.

(56) References Cited

U.S. PATENT DOCUMENTS

| | | | | |
|---|---|---|---|---|
| 8,332,672 | B2 | 12/2012 | Nguyen | |
| 8,924,750 | B2 * | 12/2014 | Jenne | G06F 1/3203 713/320 |
| 11,048,314 | B2 | 6/2021 | Ho et al. | |
| 2015/0280473 | A1 * | 10/2015 | Zhao | H02J 1/082 320/137 |
| 2017/0060154 | A1 * | 3/2017 | Ozawa | H02M 3/1584 |
| 2020/0313539 | A1 * | 10/2020 | Hall | H02M 1/4233 |
| 2022/0231613 | A1 | 7/2022 | Hsiao et al. | |

FOREIGN PATENT DOCUMENTS

| | | |
|---|---|---|
| CN | 111143137 | 3/2023 |
| TW | I750012 | 12/2021 |

* cited by examiner

*Primary Examiner* — Menatoallah Youssef
*Assistant Examiner* — Joel Barnett
(74) *Attorney, Agent, or Firm* — JCIPRNET

(57) ABSTRACT

Provided are a power supply device and a power supply method thereof. The power supply device is controlled to enter a throttling mode before the power supply device switches from an AC mode to a DC mode, a system wattage of the power supply device is reduced to a preset wattage in the throttling mode, and part of a plurality of voltage conversion circuits are disabled to reduce a phase number of an output voltage. The preset wattage is lower than the system wattage of the power supply device in the AC mode and in the DC mode.

10 Claims, 3 Drawing Sheets

POWER SUPPLY DEVICE AND POWER SUPPLY METHOD THEREOF

CROSS-REFERENCE TO RELATED APPLICATION

This application claims the priority benefit of Taiwan application serial no. 113115824, filed on Apr. 26, 2024. The entirety of the above-mentioned patent application is hereby incorporated by reference herein and made a part of this specification.

BACKGROUND

Technical Field

The disclosure relates to a power supply device and a power supply method thereof.

Description of Related Art

In the existing technology, the phase number of a voltage regulator is designed according to the system wattage of a laptop. The system wattage can be, for example, the wattage when the laptop is in a power adapter mode or the wattage when the laptop is in a battery mode. The system wattage in the power adapter mode is usually higher than the system wattage in the battery mode. Generally, the phase number of the voltage regulator is designed based on the highest system wattage. Although a larger phase number can withstand high wattage and large current, it can also sacrifice the load efficiency at low current. For example, when the load current is above a certain value, the load efficiency of an 8-phase voltage regulator is better than the load efficiency of a 4-phase voltage regulator. On the contrary, when the load current is below a certain value, the load efficiency of the 4-phase voltage regulator is better than the load efficiency of the 8-phase voltage regulator. Therefore, the voltage regulator tends to have poor load efficiency in the battery mode due to excessive phases, thereby reducing battery life and making it impossible for a user to use the laptop in the battery mode for a long time.

SUMMARY

The disclosure provides a power supply device that includes an adjustment circuit, a voltage adjustment control circuit, a control circuit, and a driver circuit. The adjustment circuit receives an alternating current (AC) voltage source in an AC mode and receives a direct current (DC) voltage source in a DC mode. The adjustment circuit includes a plurality of voltage conversion circuits, and the plurality of voltage conversion circuits provide an output voltage with a plurality of phases according to an input voltage provided by the AC voltage source or the DC voltage source. The voltage adjustment control circuit is coupled to the adjustment circuit and provides a plurality of pulse width modulation signals to a plurality of pulse width modulation signal input terminals of the voltage conversion circuits to control voltage conversion of the voltage conversion circuits. The control circuit controls a phase number of the output voltage. The driver circuit is coupled to the control circuit and at least part of a plurality of enable control terminals of the plurality of voltage conversion circuits. The control circuit controls the power supply device to enter a throttling mode before the power supply device switches from the AC mode to the DC mode. The control circuit reduces a system wattage of the power supply device to a preset wattage in the throttling mode and controls the driver circuit to disable part of the plurality of voltage conversion circuits to reduce the phase number of the output voltage. The preset wattage is lower than both the system wattage of the power supply device in the AC mode and in the DC mode.

The disclosure also provides a power supply method of a power supply device. The power supply device includes an adjustment circuit. The adjustment circuit receives an AC voltage source in an AC mode and receives a DC voltage source in a DC mode. The adjustment circuit includes a plurality of voltage conversion circuits. The plurality of voltage conversion circuits provide an output voltage with a plurality of phases according to an input voltage provided by the AC voltage source or the DC voltage source. The power supply method of the power supply device includes the following steps. Whether the power supply device switches to the AC mode or the DC mode is detected, the power supply device is controlled to enter a throttling mode before the power supply device switches from the AC mode to the DC mode, a system wattage of the power supply device is reduced to a preset wattage in the throttling mode, and part of the plurality of voltage conversion circuits are disabled to reduce a phase number of an output voltage. The preset wattage is lower than the system wattage of the power supply device in the AC mode and in the DC mode.

As mentioned above, in the embodiments of The disclosure, the power supply device is controlled to enter the throttling mode before the power supply device switches from the AC mode to the DC mode, the system wattage of the power supply device is reduced to the preset wattage in the throttling mode, and part of the plurality of voltage conversion circuits are disabled to reduce the phase number of the output voltage. The preset wattage is lower than the system wattage of the power supply device in the AC mode and in the DC mode. In this way, the power supply device can have high load efficiency both in the AC mode and in the DC mode without battery overload or triggering overcurrent protection, and the battery life of the power supply device in the DC mode can be increased.

To make the aforementioned more comprehensible, several embodiments accompanied with drawings are described in detail as follows.

DETAILED DESCRIPTION OF DISCLOSED EMBODIMENTS

Figure 1:
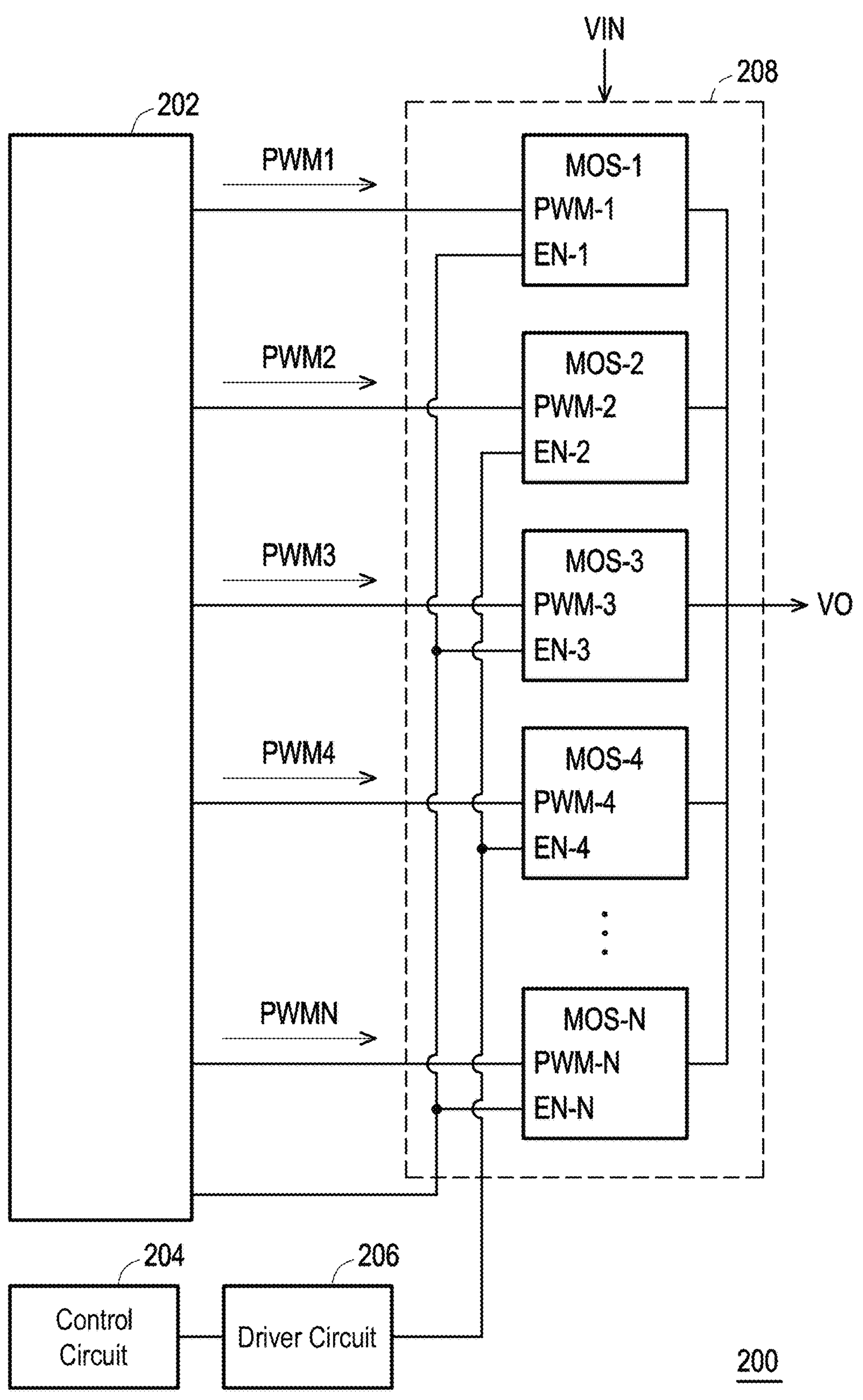
FIG. 1 is a schematic diagram of a power supply device according to an embodiment of the disclosure.

FIG. 1 is a schematic diagram of a power supply device according to an embodiment of the disclosure. For example, a power supply device 200 may be applied in a laptop, but the disclosure is not limited thereto. For example, the power supply device 200 may be implemented as a chip on a motherboard. The power supply device 200 may, for example, provide output voltages VO with different phase numbers to a central processing unit (CPU) according to a core voltage requirement when the central processing unit is under heavy load or light load. The power supply device 200 may include a voltage adjustment control circuit 202, a control circuit 204, a driver circuit 206, and an adjustment circuit 208. The adjustment circuit 208 is coupled to the voltage adjustment control circuit 202 and the driver circuit 206. The control circuit 204 is coupled to the driver circuit 206.

The adjustment circuit 208 may receive an AC voltage source (such as a power adapter) in an AC mode and a DC voltage source (such as a battery) in a DC mode. Furthermore, the adjustment circuit 208 may include a plurality of voltage conversion circuits MOS-1 to MOS-N, where N is a positive integer greater than 1. For example, in this embodiment, N is 8, but the disclosure is not limited thereto. The plurality of voltage conversion circuits MOS-1 to MOS-N provide the output voltages VO with a plurality of phases based on an input voltage VIN provided by the AC voltage source or the DC voltage source. The voltage adjustment control circuit 202 may be coupled to a plurality of enable control terminals of part of the plurality of voltage conversion circuits (coupled to enable control terminals (EN-1, EN-3 . . . ) of odd-phase voltage conversion circuits (MOS-1, MOS-3 . . . ) in this embodiment, but The disclosure is not limited thereto), enable the odd-phase voltage conversion circuits, and provide a plurality of pulse width modulation signals PWM1 to PWMN to a plurality of pulse width modulation signal input terminals PWM-1 to PWM-N of the plurality of voltage conversion circuits MOS-1 to MOS-N to control voltage conversion of the plurality of voltage conversion circuits MOS-1 to MOS-N. For example, in this embodiment, the plurality of voltage conversion circuits MOS-1 to MOS-8 may be respectively used to output the output voltages VO of Phase 1 to Phase 8.

A control circuit 204 is used to control the phase number of the output voltage VO, such as controlling the plurality of voltage conversion circuits MOS-1 to MOS-N to respectively output the output voltages VO of Phase 1 to Phase N in the AC mode, but controlling the plurality of voltage conversion circuits MOS-1 to MOS-N to output only the output voltages VO of part of the phases (output only the odd-phase output voltages VO in this embodiment) or all of the phases in the DC mode. Furthermore, the control circuit 204 may be, for example, implemented as an embedded controller, which may output a control signal to the driver circuit 206 for disabling or enabling another part of the plurality of circuit conversion circuits (coupled to a plurality of enable control terminals (EN-2, EN-4 . . . ) of the even-phase voltage conversion circuits in this embodiment, but The disclosure is not limited thereto) through a general purpose input output (GPIO) pin.

The driver circuit 206 may enhance the control signal provided by the control circuit 204 and outputs the enhanced control signal to the plurality of enable control terminals (EN-2, EN-4 . . . ) of the even-phase voltage conversion circuits (MOS-2, MOS-4 . . . ) to select between disabling or enabling the even-phase voltage conversion circuits to control the phase number of the output voltage VO.

Specifically, the control circuit 204 may detect the switching of the power supply device 200 between the AC mode and the DC mode. When the control circuit 204 detects that the power supply device 200 switches from the AC mode to the DC mode, the control circuit 204 may control the power supply device 200 to enter a throttling mode before the power supply device 200 switches from the AC mode to the DC mode. In the throttling mode, the control circuit 204 reduces a system wattage of the power supply device 200 to a preset wattage and controls the driver circuit 206 to disable part of the plurality of voltage conversion circuits (such as disabling the even-phase voltage conversion circuits) to reduce the phase number of the output voltage VO.

In some embodiments, the voltage adjustment control circuit 202 may also select a plurality of voltage conversion circuits to disable together with the control circuit 204. In other words, the plurality of voltage conversion circuits that are disabled are not limited to the even-phase voltage conversion circuits, and various combinations may also be selected based on actual requirements. In the DC mode, the number of voltage conversion circuits disabled by the control circuit 204 (that is, the turned off phase number of the output voltage VO) depends on the system wattage in the DC mode and is not limited to turning off half of the plurality of phases as mentioned above. The higher the system wattage, the fewer the turned off phase number, and vice versa. The reduction manner of the phase number is based on the principle of avoiding excessively high or low voltage distortion waveform of the output voltage VO. For example, for the 8-phase output voltage VO, Phases 2, 4, 6, and 8 may be selected to be turned off, and Phases 5, 6, 7, and 8 may not be selected to be turned off. In some embodiments, the plurality of enable control terminals EN-1 to EN-N of the plurality of voltage conversion circuits MOS-1 to MOS-N may also be all coupled to the driver circuit 206, so that the control circuit 204 and the driver circuit 206 are in charge of the operation of disabling and enabling the plurality of voltage conversion circuits MOS-1 to MOS-N.

Figure 2:
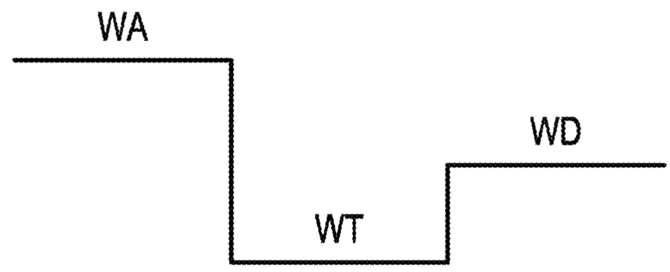
FIG. 2 and FIG. 3 are schematic diagrams of changes in system wattage according to embodiments of the disclosure.

In addition, in some embodiments, the manner of reducing the system wattage of the power supply device 200 to the preset wattage may be, for example, to quickly bring the system wattage to the preset wattage through a hardware throttling circuit. The manner of detecting whether the power supply device 200 is in the AC mode or the DC mode may be, for example, performed through a detect pin inside a DC jack. When the power adapter is unplugged from the DC jack, a ground pin of the power adapter first disconnects from the detect pin in the DC jack. At this time, an AC voltage is still in connection with the DC jack, so the system wattage remains to be the system wattage in the AC mode without being switched to the system wattage in the DC mode yet. At this point, the hardware throttling circuit may be used to quickly bring the system wattage to the preset wattage. A preset wattage WT may be as shown in FIG. 2 and is lower than a system wattage WA of the power supply device 200 in the AC mode and a system wattage WD of the power supply device 200 in the DC mode. Since the hardware throttling circuit is limited by a setting time limit of a capacitive/inductive element, it is difficult to maintain the system wattage at the preset wattage for a long time. The control circuit 204 may set the system wattage through a software to continuously maintain the system wattage at the preset wattage WT.

After the control circuit 204 sets the system wattage to be the system wattage WD in the DC mode and completes adjusting the phase number of the output voltage VO, the control circuit 204 may control the power supply device 200 to end the throttling mode and enter the DC mode. In some embodiments, since the control circuit 204 is not notified whether the adjustment of the phase number is completed, the control circuit 204 may automatically release the setting of maintaining the system wattage at the preset wattage WT after a default period of time since the control signal for disabling part of the plurality of voltage conversion circuits is provided, and adjust the system wattage of the power supply device 200 from the preset wattage WT to the system wattage WD corresponding to the DC mode.

Figure 3:
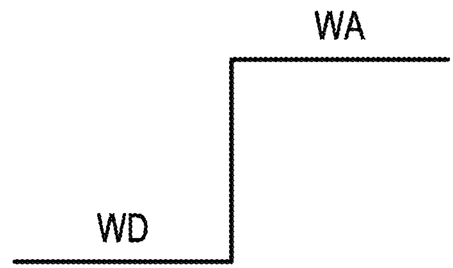

In addition, when the control circuit 204 detects that the power supply device 200 switches from the DC mode to the AC mode, since battery overload or triggering overcurrent protection does not need to be considered, the control circuit may be as shown in FIG. 3 and directly adjusts the system wattage WD of the power supply device 200 in the DC mode to the system wattage WA in the AC mode and controls the driver circuit 206 to enable a plurality of voltage conversion circuits that are disabled (such as the even-phase plurality of voltage conversion circuits) to restore the phase number of the output voltage VO.

As mentioned above, in the embodiment of The disclosure, the power supply device 200 may be controlled to enter the throttling mode before the power supply device 200 switches from the AC mode to the DC mode, the system wattage of the power supply device 200 is reduced to the preset wattage in the throttling mode, and part of the plurality of voltage conversion circuits are disabled to reduce the phase number of the output voltage VO. In comparison with the conventional technology in which the phase number of the output voltage VO cannot be freely adjusted corresponding to the switching between the AC mode and the DC mode, the embodiment of The disclosure enables the power supply device to have high load efficiency both in the AC mode and in the DC mode without battery overload or triggering overcurrent protection and can increase the battery life of the power supply device in the DC mode.

Figure 4:
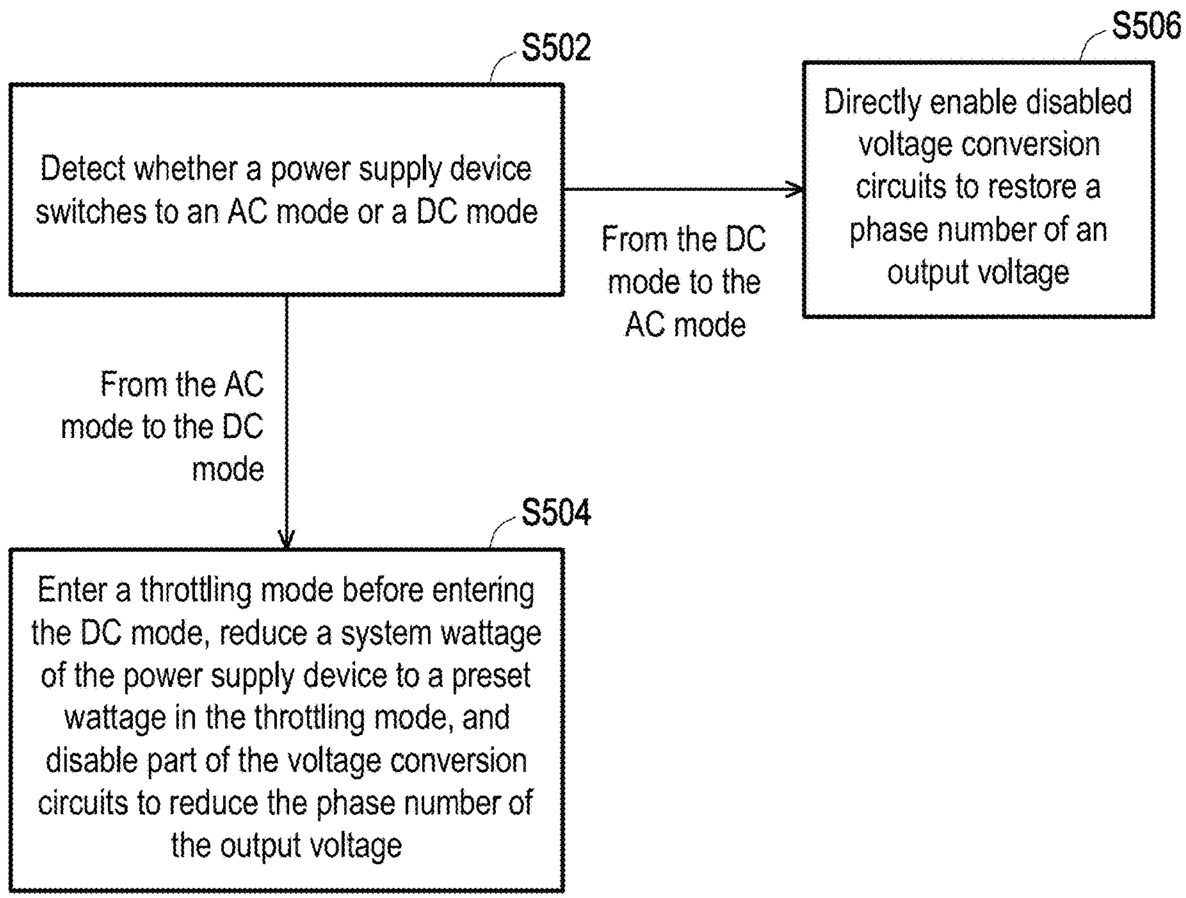
FIG. 4 is a flow chart of a power supply method of a power supply device according to an embodiment of the disclosure.

FIG. 4 is a flow chart of a power supply method of a power supply device according to an embodiment of the disclosure. The power supply device includes an adjustment circuit. The adjustment circuit receives an AC voltage source in an AC mode and receives a DC voltage source in a DC mode. The adjustment circuit includes a plurality of voltage conversion circuits, and the plurality of voltage conversion circuits provide an output voltage with a plurality of phases according to an input voltage provided by the AC voltage source or the DC voltage source. According to the embodiments mentioned above, the power supply method of the power supply device includes the following steps. First, whether a power supply device switches to an AC mode or a DC mode is detected (S502), the power supply device is controlled to enter a throttling mode before the power supply device switches from the AC mode to the DC mode, a system wattage of the power supply device is reduced to a preset wattage in the throttling mode, and part of the plurality of voltage conversion circuits are disabled to reduce a phase number of an output voltage (S504). For example, the even-phase or odd-phase voltage conversion circuits may be disabled to reduce the phase number of the output voltage to half, but The disclosure is not limited thereto, wherein the preset wattage is lower than the system wattage of the power supply device in the AC mode and in the DC mode. In some embodiments, the throttling mode ends after a default period of time since the power supply device enters the throttling mode, and the system wattage of the power supply device is adjusted to the system wattage corresponding to the DC mode. When the power supply device switches from the DC mode to the AC mode, the plurality of voltage conversion circuits that are disabled are enabled to restore the phase number of the output voltage (S506).

In summary, in the embodiments of The disclosure, the power supply device is controlled to enter the throttling mode before the power supply device switches from the AC mode to the DC mode, the system wattage of the power supply device is reduced to the preset wattage in the throttling mode, and part of the plurality of voltage conversion circuits are disabled to reduce the phase number of the output voltage, wherein the preset wattage is lower than the system wattage of the power supply device in the AC mode and in the DC mode. In this way, the power supply device can have high load efficiency both in the AC mode and in the DC mode without battery overload or triggering overcurrent protection, and the battery life of the power supply device in the DC mode can be increased.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A power supply device, comprising:

an adjustment circuit, receiving an alternating current (AC) voltage source in an AC mode and receiving a direct current (DC) voltage source in a DC mode, wherein the adjustment circuit comprises a plurality of voltage conversion circuits, and the plurality of voltage conversion circuits provide an output voltage with a plurality of phases according to an input voltage provided by the AC voltage source or the DC voltage source;

a voltage adjustment control circuit, coupled to the adjustment circuit and providing a plurality of pulse width modulation signals to a plurality of pulse width modulation signal input terminals of the plurality of voltage conversion circuits to control voltage conversion of the plurality of voltage conversion circuits;

a control circuit, controlling a phase number of the output voltage; and a driver circuit, coupled to the control circuit and a plurality of enable control terminals of at least part of the plurality of voltage conversion circuits, wherein the control circuit controls the power supply device to enter a throttling mode before the power supply device switches from the AC mode to the DC mode, and the control circuit reduces a system wattage of the power supply device to a preset wattage in the throttling mode, and controls the driver circuit to disable part of the plurality of voltage conversion circuits to reduce the phase number of the output voltage, wherein the preset wattage is lower than the system wattage of the power supply device in the AC mode and in the DC mode.

2. The power supply device according to claim 1, wherein the control circuit directly controls the driver circuit to enable the plurality of voltage conversion circuits that are disabled when the power supply device switches from the DC mode to the AC mode to restore the phase number of the output voltage.

3. The power supply device according to claim 1, wherein the control circuit controls the driver circuit to disable the plurality of even-phase or odd-phase voltage conversion circuits in the throttling mode.

4. The power supply device according to claim 1, wherein the control circuit adjusts the system wattage of the power supply device to the system wattage corresponding to the DC mode when the throttling mode ends.

5. The power supply device according to claim 1, wherein the control circuit adjusts the system wattage of the power supply device to the system wattage corresponding to the DC mode after a default period of time since a control signal for disabling the plurality of voltage conversion circuits is provided.

6. The power supply device according to claim 1, wherein the driver circuit enhances a control signal provided by the control circuit.

7. A power supply method of a power supply device, wherein the power supply device comprises an adjustment circuit, the adjustment circuit receives an AC voltage source in an AC mode and receives a DC voltage source in a DC mode, the adjustment circuit comprises a plurality of voltage conversion circuits, and the plurality of voltage conversion circuits provide an output voltage with a plurality of phases according to an input voltage provided by the AC voltage source or the DC voltage source, the power supply method of the power supply device comprising:

detecting whether the power supply device switches to the AC mode or the DC mode; and controlling the power supply device to enter a throttling mode before the power supply device switches from the AC mode to the DC mode, reducing a system wattage of the power supply device to a preset wattage in the throttling mode, and disabling part of the plurality of voltage conversion circuits to reduce a phase number of the output voltage, wherein the preset wattage is lower than the system wattage of the power supply device in the AC mode and in the DC mode.

8. The power supply method of the power supply device according to claim 7, comprising:

directly enabling the plurality of voltage conversion circuits that are disabled when the power supply device switches from the DC mode to the AC mode to restore the phase number of the output voltage.

9. The power supply method of the power supply device according to claim 7, comprising:

disabling the plurality of even-phase or odd-phase voltage conversion circuits in the throttling mode.

10. The power supply method of the power supply device according to claim 7, comprising:

ending the throttling mode after a default period of time since the power supply device enters the throttling mode and adjusting the system wattage of the power supply device to the system wattage corresponding to the DC mode.

* * * * *